United States Patent
Parker et al.

(10) Patent No.: US 7,701,092 B1
(45) Date of Patent: Apr. 20, 2010

(54) CONNECTOR MODULE WITH EMBEDDED POWER-OVER-ETHERNET VOLTAGE ISOLATION AND METHOD

(75) Inventors: Timothy J. Parker, Cupertino, CA (US); Nian Zhou, Cupertino, CA (US)

(73) Assignee: Avaya, Inc., Westminster, CO (US)

( * ) Notice: Subject to any disclaimer, the term of this patent is extended or adjusted under 35 U.S.C. 154(b) by 1131 days.

(21) Appl. No.: 10/741,920

(22) Filed: Dec. 19, 2003

(51) Int. Cl.
H02J 1/00 (2006.01)
H02B 1/24 (2006.01)

(52) U.S. Cl. .................................. 307/154; 307/17
(58) Field of Classification Search .............. 307/17, 307/154
See application file for complete search history.

(56) References Cited

U.S. PATENT DOCUMENTS

| | | | |
|---|---|---|---|
| 3,916,286 A | 10/1975 | Waehner | |
| 5,649,100 A | 7/1997 | Ertel et al. | |
| 5,949,974 A * | 9/1999 | Ewing et al. | 709/202 |
| 6,473,608 B1 * | 10/2002 | Lehr et al. | 455/402 |
| 6,480,909 B1 | 11/2002 | Chun | |
| 6,483,203 B1 * | 11/2002 | McCormack | 307/17 |
| 6,541,878 B1 * | 4/2003 | Diab | 307/17 |
| 6,587,476 B1 | 7/2003 | Lewin et al. | |
| 6,608,264 B1 * | 8/2003 | Fouladpour | 200/51.03 |
| 6,711,613 B1 * | 3/2004 | Ewing et al. | 709/223 |
| 6,764,343 B2 | 7/2004 | Ferentz | |
| 6,840,817 B2 * | 1/2005 | Chen | 439/676 |
| 6,881,096 B2 | 4/2005 | Brown et al. | |
| 6,916,206 B2 | 7/2005 | Ferentz | |
| 6,954,863 B2 * | 10/2005 | Mouton | 713/300 |
| 6,977,507 B1 * | 12/2005 | Pannell et al. | 324/534 |
| 6,996,458 B2 * | 2/2006 | Pincu et al. | 700/297 |
| 7,021,839 B2 * | 4/2006 | Ho | 385/92 |
| 7,026,730 B1 * | 4/2006 | Marshall et al. | 307/147 |
| 7,030,733 B2 * | 4/2006 | Abbarin | 340/310.11 |
| 7,046,983 B2 * | 5/2006 | Elkayam et al. | 455/402 |
| 7,081,827 B2 * | 7/2006 | Addy | 340/693.2 |
| 2002/0002672 A1 | 1/2002 | Mouton | |
| 2003/0099076 A1 | 5/2003 | Elyayam et al. | |
| 2003/0110306 A1 * | 6/2003 | Bailis et al. | 709/253 |
| 2003/0129877 A1 * | 7/2003 | Chen | 439/607 |
| 2004/0014362 A1 | 1/2004 | Slack et al. | |
| 2004/0068535 A1 | 4/2004 | Subbiah et al. | |

(Continued)

FOREIGN PATENT DOCUMENTS

WO  WO 2004/077738 A3  9/2004

OTHER PUBLICATIONS

U.S. Appl. No. 10/609,070, filed Jun. 27, 2003, Parker et al.

(Continued)

*Primary Examiner*—Jared J Fureman
*Assistant Examiner*—Hal I Kaplan

(57) ABSTRACT

A connector module includes a jack socket capable of receiving a communication link. The connector module also includes magnetics coupled to the jack socket for supplying power to a peripheral device coupled to the link through the jack socket. The connector module further includes Power-over-Ethernet management logic for controlling the supplying of power to the peripheral device by providing a voltage to the magnetics. In addition, the connector module includes at least one voltage isolator for isolating the voltage used by the Power-over-Ethernet management logic from at least one digitally-referenced voltage.

25 Claims, 8 Drawing Sheets

U.S. PATENT DOCUMENTS

| | | | |
|---|---|---|---|
| 2005/0047431 | A1 | 3/2005 | Binder |
| 2005/0080516 | A1 | 4/2005 | Pincu et al. |
| 2005/0106941 | A1 | 5/2005 | Witchey |
| 2005/0125507 | A1 | 6/2005 | Atias et al. |
| 2005/0136989 | A1* | 6/2005 | Dove .......................... 455/572 |
| 2005/0201306 | A1* | 9/2005 | Engel .......................... 370/299 |
| 2005/0229016 | A1 | 10/2005 | Addy |
| 2006/0053324 | A1 | 3/2006 | Giat et al. |

OTHER PUBLICATIONS

Avaya: "Avaya 1152A1 Mid Span Power Supply," Internet citation, (online) 2002, XP002285733, URL:http//www.avaya.com/enterprise/factsheets/1b1895.pdf; Jun. 23, 2004; pp. 1-2.

Linear Technology: "LTC4255 Quad Network Controller with 12C Compatible Interface;" Internet citation, (online) 2002, XP002285734; URL:http//www.liear.com/pdg/4255f.pdf: Jun. 23, 2004: pp. 1-2, 6-7, and 11-14.

Robert Lenowich: "IEEE 802.3af DTE Power via MDI Detection and Signature Tutorial;" Internet citation, (online) 2002, XP002286255; URL://www.ieee802.org/3/tutorial/jul00/tutorial_2_0700.pdf; Jun. 28, 2004.

3Com Press Release, 3Com Turns Basic Outlets Into Intelligent Network Connections, Nov. 12, 2001; http://www.3com.com/corpinfo/en_US/pressbox/pres_release.jsp?-INFO_ID=7564.

3Com Press Release, 3Com Unveils New Network Jack "In-The-Wall" Lan Switch, Oct. 28, 2002; http://www.3com.com/corpinfo/en_US/pressbox/press_release.jsp?-INFO_ID=137660.

3Com Installation Guide, NJ100 Network Jack, 3CNJ100 4-port 10/100 Mbps Unmanaged Ethernet Switch, Sep. 2001.

3Com User Guide 3Com Network Jack, Model NJ200, Sep. 2002.

Office Action dated Apr. 5, 2006 as issued in U.S. Appl. No. 10/609,079.

Office Action dated Oct. 11, 2006 as issed in U.S. Appl. No. 10/609,079.

Office Action dated Jun. 28, 2007 as issued in U.S. Appl. No. 10/609,079.

Office Action dated Feb. 20, 2008 as issued in U.S. Appl. No. 10/609,079.

Office Action dated Feb. 2, 2007 as issued in U.S. Appl. No. 10/741,915.

Office Action dated Sep. 20, 2007 as issued in U.S. Appl. No. 10/741,915.

Office Action dated Mar. 30, 2007 as issued in U.S. Appl. No. 10/741,922.

Office Action dated Oct. 12, 2007 as issued in U.S. Appl. No. 10/741,922.

3Com Implementing Power Over Ethernet With 3Com Network Jacks, 2003.

802.3af, Part 3: Carrier Sense Multiple Access with Collision Detection (CSMA/CD) Access Method and Physical Layer Specifications/Amendment: Data Terminal Equipment (DTE) Power via Media Dependent Interface (MDI), IEEE, Jun. 18, 2003.

International Search Report issued by the International Searching Authority on Oct. 28, 2004 in related International Patent Application No. PCT/US2004/002683.

Written Opinion issued by the International Searching Authority on Oct. 28, 2004 in related International Patent Application No. PCT/2004/002683.

* cited by examiner

CONNECTOR MODULE WITH EMBEDDED POWER-OVER-ETHERNET VOLTAGE ISOLATION AND METHOD

CROSS-REFERENCE TO RELATED APPLICATIONS

This patent application is related to:

U.S. patent application Ser. No. 10/609,079, entitled "A CONNECTOR MODULE WITH EMBEDDED POWER-OVER-ETHERNET FUNCTIONALITY" filed on Jun. 27, 2003;

U.S. patent application Ser. No. 10/741,922, entitled "CONNECTOR MODULE WITH REMOVABLE POWER-OVER-ETHERNET MANAGEMENT LOGIC AND METHOD" filed on Dec. 19, 2003; and U.S. patent application Ser. No. 10/741,915, entitled "CONNECTOR MODULE WITH EMBEDDED PHYSICAL LAYER SUPPORT AND METHOD" filed on Dec. 19, 2003;

which are all hereby incorporated by reference.

TECHNICAL FIELD

This disclosure relates generally to communication systems and more specifically to a connector module with embedded Power-over-Ethernet voltage isolation and method.

BACKGROUND

Power-over-Ethernet or "PoE" technology is becoming more and more popular as a mechanism for providing power to peripheral devices in computing systems. Using this technology, a peripheral device is connected by a cable to a switching device or other device. The switching or other device is capable of receiving and retaining the cable. The switching or other device then provides operating power to the peripheral device over the cable. In this way, the peripheral device does not need to be plugged into both the switching or other device and a power outlet.

SUMMARY

This disclosure provides a connector module with removable Power-over-Ethernet management logic and method.

In one aspect, a connector module includes a jack socket capable of receiving a communication link. The connector module also includes magnetics coupled to the jack socket. The magnetics are capable of supplying power to a peripheral device coupled to the link through the jack socket. The connector module further includes Power-over-Ethernet management logic capable of controlling the supplying of power to the peripheral device by providing a voltage to the magnetics. In addition, the connector module includes at least one voltage isolator capable of isolating the voltage used by the Power-over-Ethernet management logic from at least one digitally-referenced voltage.

In another aspect, a method includes receiving a voltage for Power-over-Ethernet management logic from a power supply. The Power-over-Ethernet management logic forms a portion of a connector module capable of being coupled to a peripheral device over a communication link. The method also includes isolating the voltage received for the Power-over-Ethernet logic from the power supply and at least one digitally-referenced voltage used by the connector module.

Other technical features may be readily apparent to one skilled in the art from the following figures, descriptions, and claims.

BRIEF DESCRIPTION OF THE DRAWINGS

For a more complete understanding of this disclosure, reference is now made to the following description, in which.

DETAILED DESCRIPTION

Figure 1:
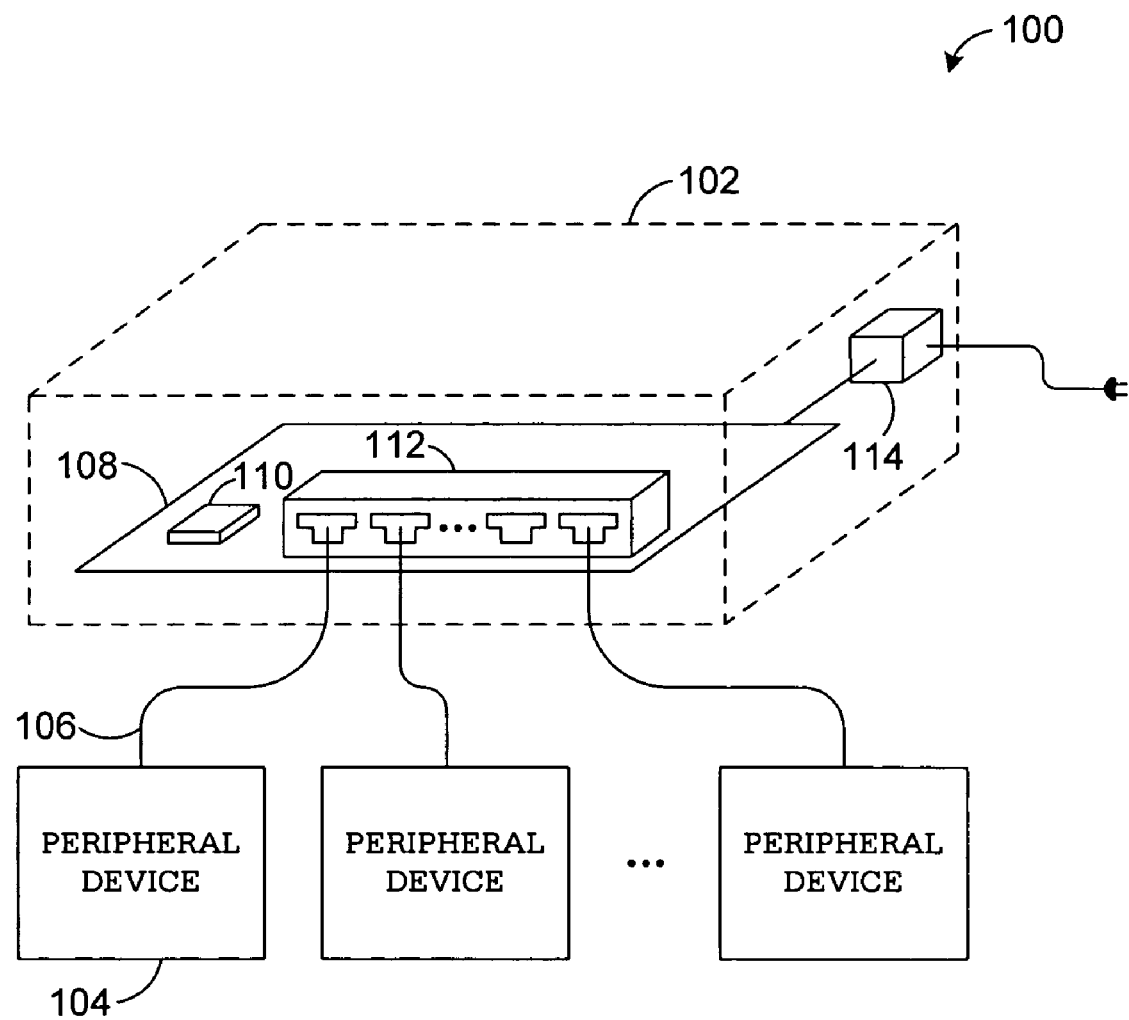
FIG. 1 illustrates an example system for providing power to and communicating with peripheral devices according to one embodiment of this disclosure.

FIG. 1 illustrates an example system 100 for providing power to and communicating with peripheral devices according to one embodiment of this disclosure. The system 100 shown in FIG. 1 is for illustration only. Other systems may be used without departing from the scope of this disclosure.

In the illustrated example, the system 100 includes a switching device 102 coupled to one or more peripheral devices 104. In this document, the term "couple" and its derivatives refer to any direct or indirect communication between two or more elements, whether or not those elements are in physical contact with one another. In this example, the switching device 102 facilitates communication with and between the peripheral devices 104. The switching device 102 also provides operating power to one or more of the peripheral devices 104. The switching device 102 includes any hardware, software, firmware, or combination thereof for communicating with the peripheral devices 104 and/or providing power to one or more peripheral devices 104.

Each of the peripheral devices 104 is coupled to the switching device 102 over a communication link 106. The peripheral devices 104 may support any suitable functionality in the system 100. For example, the peripheral devices 104 could include Internet Protocol (IP) telephones, wireless access points, network cameras, or any other suitable devices. The peripheral devices 104 communicate with the switching device 102 using any suitable mechanism, such as 10Base-T, 100Base-T, and/or 1000Base-T Ethernet. In some embodiments, at least one of the peripheral devices 104 receives operating power from the switching device 102. In particular embodiments, a peripheral device 104 represents a device compliant with the IEEE 802.3 standard and/or the IEEE 802.3af standard.

The communication links 106 couple the switching device 102 to the peripheral devices 104. Each link 106 represents any suitable connection for facilitating the transport of information and/or power between the switching device 102 and a peripheral device 104. A link 106 may, for example, represent a Category-5 (Cat-5) cable, a Category-4 (Cat-4) cable, or a Category-3 (Cat-3) cable. In particular embodiments, a link 106 includes multiple twisted-pairs, where each twisted-pair includes two wires. In these embodiments, at least two twisted-pairs are used to transport power from the switching device 102 to a peripheral device 104.

In the illustrated example, the switching device 102 includes a motherboard 108. The motherboard 108 implements the switching functionality of the switching device 102 and facilitates communication with and between the peripheral devices 104. The motherboard 108 also supports the supplying of power to one or more of the peripheral devices 104. In this example, the motherboard 108 includes a switching processor 110 and a connector module 112.

The switching processor 110 facilitates the receipt of information from and the transmission of information to the peripheral devices 104. The switching processor 110 also facilitates the communication of information between various peripheral devices 104 by routing information received from one peripheral device 104 to another peripheral device 104. The switching processor 110 may further support Medium Access Control (MAC) functionality and other higher layer switching and/or routing functionalities, such as those specified in the IEEE 802.3 standard. The switching processor 110 represents any hardware, software, firmware, or combination thereof for controlling communications with and between the peripheral devices 104.

Figure 2A:
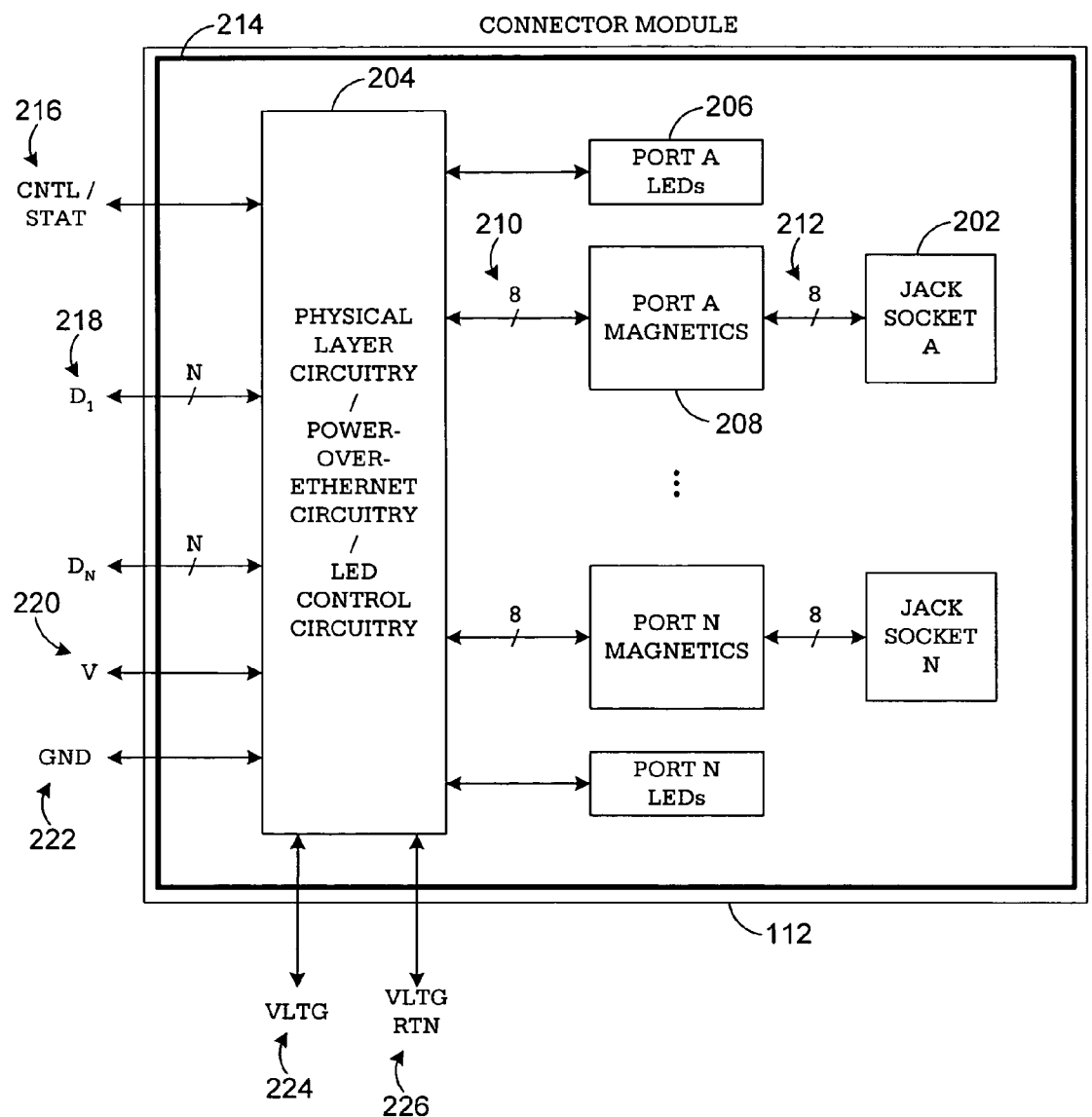
FIGS. 2A through 2C illustrate example connector modules according to one embodiment of this disclosure.
Figure 2B:
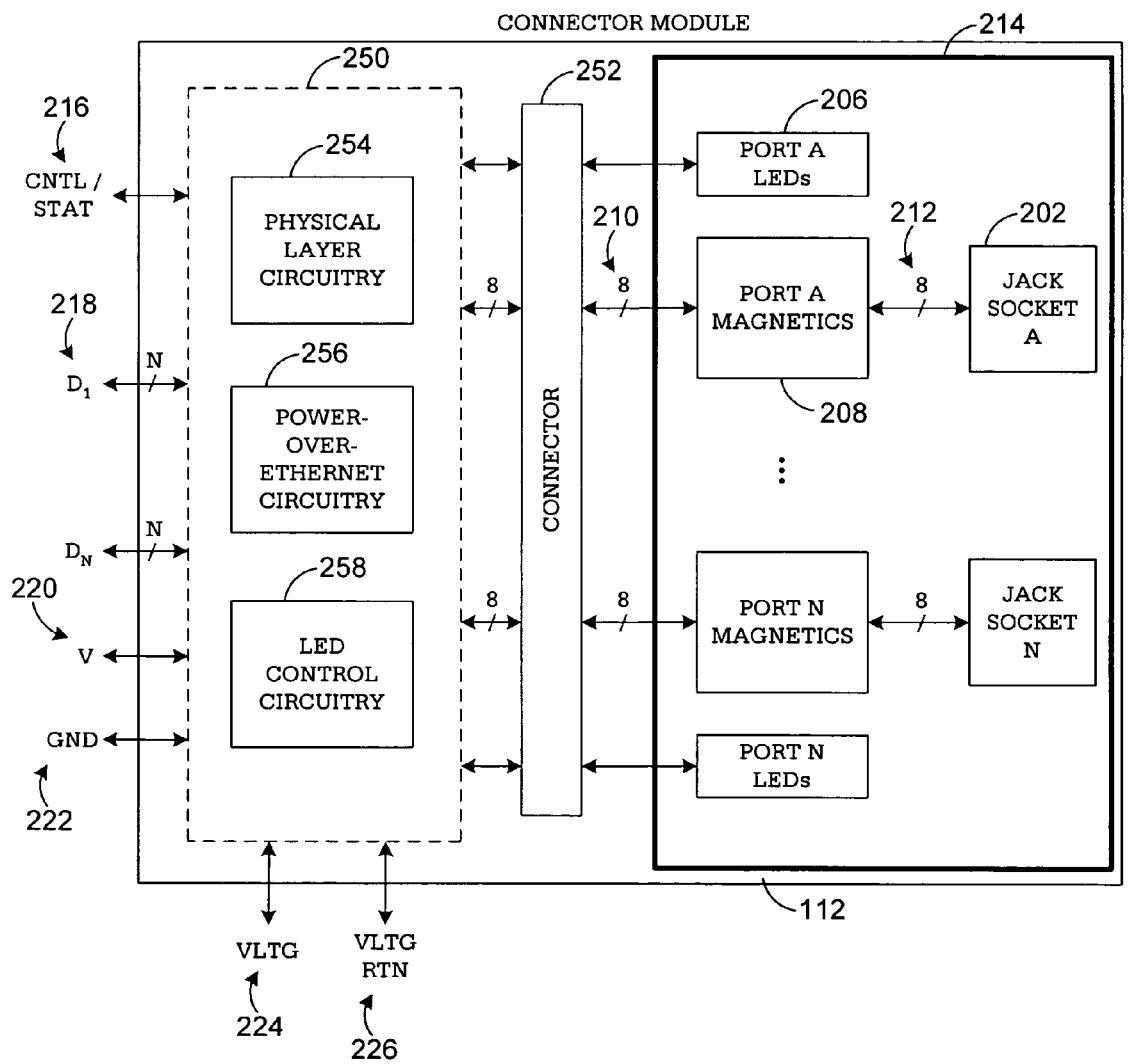
Figure 2C:
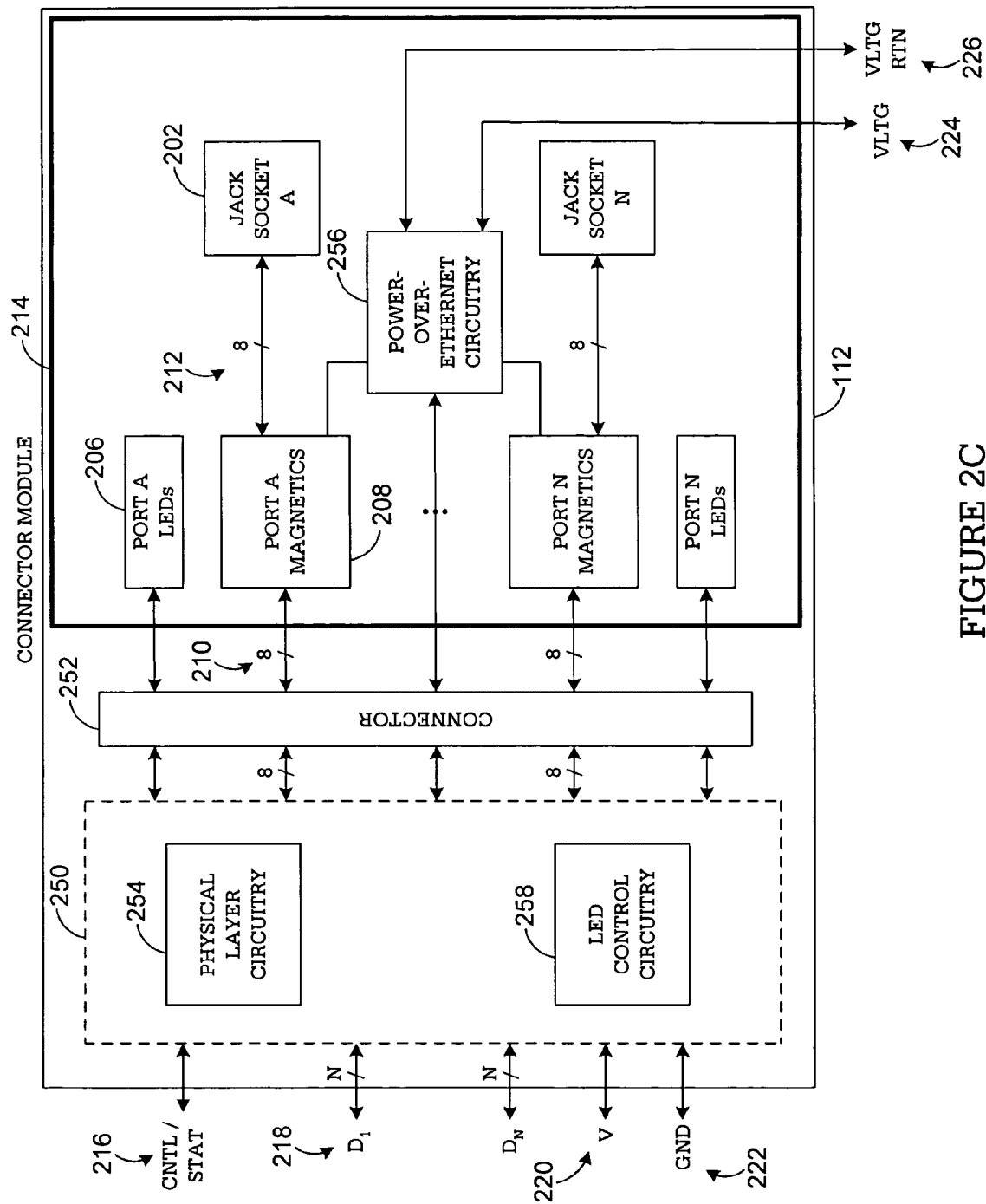

The connector module 112 is capable of receiving and retaining the links 106 used to couple the switching device 102 and the peripheral devices 104. The connector module 112 is also capable of electrically connecting the links 106 to the remaining circuitry of the motherboard 108, such as the switching processor 110. For example, the connector module 112 may electrically connect wires in a link 106 to traces on the motherboard 108. The connector module 112 represents any structure capable of receiving and retaining one or more links 106. As particular examples, the connector module 112 may include one or more RJ-45 jacks capable of receiving and retaining links 106 having eight wires or RJ-21 jacks capable of receiving and retaining links 106 having fifty wires. Several example embodiments of the connector module 112 are shown in FIGS. 2A through 2C, which are described below.

As described in greater detail below, in some embodiments, the connector module 112 includes logic embedded in the connector module 112. The logic supports the physical layer protocol used to transmit and receive information to and from the peripheral devices 104 over the links 106. Also, in some embodiments, the connector module 112 includes removable logic supporting the transport of power to at least one peripheral device 104 over a link 106. The removable logic may be inserted into and removed from the connector module 112. In addition, in some embodiments, the connector module 112 includes an isolation mechanism for isolating voltages used to supply power to at least one peripheral device 104 from digitally-referenced voltages. In this document, the term "logic" refers to any hardware, software, firmware, or combination thereof for performing one or more functions. Logic may, for example, represent circuitry, a microprocessor, a field programmable gate array (FPGA), or an application specific integrated circuit (ASIC). While certain portions of this document may describe the use of a particular type of logic such as "circuitry," any other type or types of logic could be used in place of the circuitry. Also, a component is "embedded" in the connector module 112 when it forms at least part of the connector module 112.

A power supply 114 supplies power to the components of the switching device 102, such as the switching processor 110 and the connector module 112. For example, the power supply 114 may receive alternating current (AC) power from an electrical outlet and convert the AC power into a direct current (DC) voltage. However, the power supply 114 is not limited to receiving AC power only. As an example, the power supply 114 may receive DC voltage and then convert the DC voltage into a proper DC voltage required by the connector module 112 or the motherboard 108. In some embodiments, the connector module 112 receives power indirectly from the power supply 114 through the motherboard 108. In other embodiments, the connector module 112 receives power directly from the power supply 114, and the connector module 112 isolates the power from digitally-referenced voltages. In particular embodiments, the power supply 114 nominally provides a 48V supply and a 48V return for the connector module 112.

Although FIG. 1 illustrates one example of a system 100 for providing power to and communicating with peripheral devices 104, various changes may be made to FIG. 1. For example, the switching device 102 could be replaced by any other device capable of communicating with and/or providing power to one or more peripheral devices 104. Also, any number of peripheral devices 104 may be coupled to the switching device 102. In addition, the switching device 102 may be coupled to multiple peripheral devices 104 and provide power to one, some, or all of the peripheral devices 104.

FIGS. 2A through 2C illustrate example connector modules 112 according to one embodiment of this disclosure. The connector modules 112 shown in FIGS. 2A through 2C are for illustration only. Other embodiments of the connector module 112 could be used without departing from the scope of this disclosure. Also, the connector modules 112 shown in FIGS. 2A through 2C could be used in the switching device 102 of FIG. 1 or in any other suitable device, system, or structure.

As shown in FIG. 2A, the connector module 112 includes multiple jack sockets 202. The jack sockets 202 are capable of receiving and retaining the links 106 connected to the peripheral devices 104. Each jack socket 202 represents a structure that receives and retains a link 106. For example, a jack socket 202 could represent a RJ-45 or a RJ-21 socket.

The connector module 112 also includes embedded physical layer circuitry 204. The physical layer circuitry 204 supports the physical layer protocol or protocols used to communicate with the peripheral devices 104 over the links 106. For example, the physical layer circuitry 204 may send and receive bitstreams in the form of electrical impulses through the links 106 to and from the peripheral devices 104. As particular examples, the physical layer circuitry 204 may support 10Base-T, 100Base-T, and/or 1000Base-T Ethernet. As a particular example, the circuitry 204 could represent an integrated circuit chip.

As shown in FIG. 2A, the embedded physical layer circuitry 204 may support additional functionality beyond supporting the physical layer protocol. For example, the physical layer circuitry 204 could include Power-over-Ethernet circuitry. The Power-over-Ethernet circuitry controls the transfer of power to one or more of the peripheral devices 104 over one or more links 106. As particular examples, the Power-over-Ethernet circuitry could be operable to perform detection and classification of IEEE 802.3af compliant peripheral devices 104, initialization, power management, power control, and status collection. The Power-over-Ethernet circuitry could also include the ability to open and close switches (internal or external to the circuitry 204), where the switches control whether power is supplied to the peripheral devices 104 over the links 106. The Power-over-Ethernet circuitry may further control the amount of power supplied to a peripheral device 104 over a link 106, such as when different classes of peripheral devices 104 receive different amounts of power. In addition, the Power-over-Ethernet circuitry may identify when a link 106 has been disconnected from the connector module 112 and discontinue supplying power to the peripheral device 104 connected to the link 106 (if power was being supplied).

The embedded physical layer circuitry 204 could also support light emitting diode (LED) control circuitry. The LED control circuitry controls the operation of one or more LEDs 206 associated with each jack socket 202. An LED 206 provides at least one visual indicator associated with at least one condition of a link 106. For example, an LED 206 associated with a jack socket 202 may have a first color or blinking interval when a peripheral device 104 that can receive power from the switching device 102 (such as an IEEE 802.3af compliant device) is connected to the jack socket 202. The LED 206 may have a second color or blinking interval when a peripheral device 104 that cannot receive power from the switching device 102 is connected to the jack socket 202. The LED 206 may have a third color or blinking interval when the connector module 112 detects a fault associated with a peripheral device 104. The LED control circuitry controls the state in which an LED 206 operates. For example, the LED control circuitry could detect when various events occur and drive the LED 206 into the state corresponding to the detected events.

While FIG. 2A illustrates the use of a single component 204 to implement physical layer protocol support, Power-over-Ethernet support, and LED control, any suitable number of components could be used. For example, each of these functions could be implemented as a separate component. Also, two of these functions could be implemented on one component and the third implemented on another component.

Figure 3:
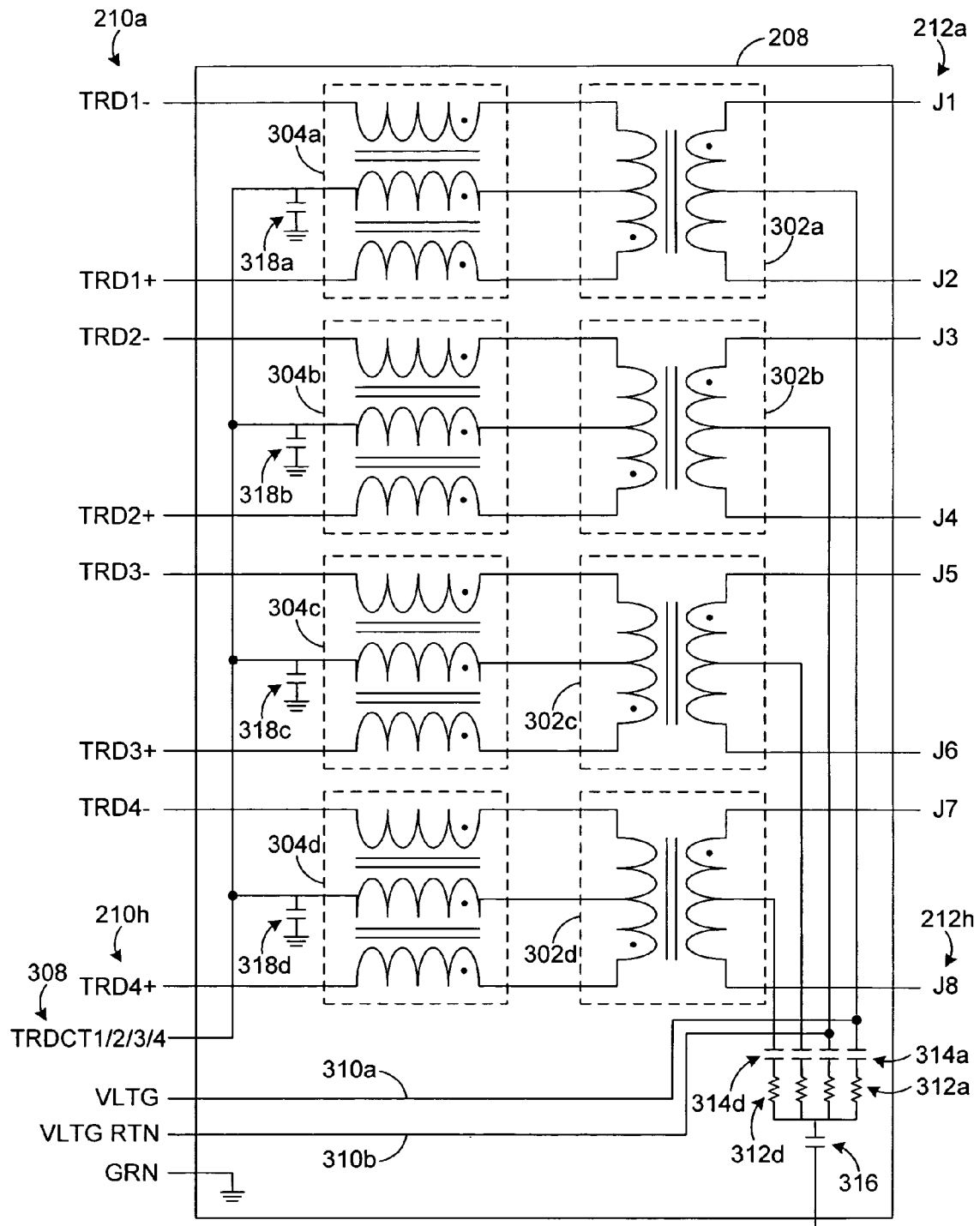
FIG. 3 illustrates example magnetics in a connector module according to one embodiment of this disclosure.

Magnetics 208 couple the physical layer circuitry 204 to each jack socket 202. The magnetics 208 perform various functions in the connector module 112. For example, among other things, the magnetics 208 provide a bridge between the physical layer circuitry 204 and the jack socket 202 and prevent DC voltage and current from flowing into the link 106 through the jack socket 202. One example embodiment of the magnetics 208 is shown in FIG. 3, which is described below.

In the example shown in FIG. 2A, the magnetics 208 associated with each jack socket 202 have eight connections 210 to the physical layer circuitry 204 and eight connections 212 to the jack socket 202. In other embodiments, a different number of connections 210, 212 may be used. For example, the magnetics 208 associated with each jack socket 202 could have at least two "center taps," and the at least two center taps could be connected to and controlled by the Power-over-Ethernet circuitry.

The connector module 112 of FIG. 2A is encased in shielding 214. The shielding 214 protects other components of the switching device 102 from electro-magnetic forces or other interference caused by the operation of the connector module 112.

The physical layer circuitry 204 receives and produces various signals. For example, the physical layer circuitry 204 may receive or generate control and status signals 216. The control signals control the operation of the physical layer circuitry 204 or other components in the switching device 102. The status signals represent the status of the physical layer circuitry 204 or other components in the switching device 102.

For each of the jack sockets 202, the physical layer circuitry 204 also transmits and receives data signals ($D_1$ through $D_N$) 218, which represent the data sent and received over the link 106 through the jack socket 202. In some embodiments, the data signals 218 for each jack socket 202 are communicated to and from the switching processor 110 over two wires, although other numbers of connections may be used. In particular embodiments, the data signals 218 represent differential signaling communicated to and from the physical layer circuitry 204 over a serial interface. As particular examples, the physical layer circuitry 204 supports a serializer/deserializer (SERDES) interface or a Serial Media Independent Interface (SMII) for each jack socket 202. By using fewer wires to interface the physical layer circuitry 204 and the motherboard 108, this may reduce the number of traces or paths needed on the motherboard 108. This may help to reduce the size and cost of the motherboard 108.

The physical layer circuitry 204 further receives a digital voltage 220 and a digital ground 222. The digital voltage 220 and the digital ground 222 represent voltage signals used by the physical layer circuitry 204 to perform various functions. In addition, the Power-over-Ethernet circuitry on the physical layer circuitry 204 receives a power supply voltage 224 and a power supply voltage return 226. Among other things, the Power-over-Ethernet circuitry uses the power supply voltage 224 and voltage return 226 to supply power to peripheral devices 104 through the magnetics 208. As described in more detail below, the digital voltage 220 and digital ground 222 are isolated from the power supply voltage 224 and voltage return 226 by one more components in the connector module 112. By isolating the different voltages within the connector module 112, the voltages need not be isolated in the motherboard 108. This may help to reduce the size and cost of the motherboard 108.

As shown in FIG. 2B, another embodiment of the connector module 112 includes a removable printed circuit board 250 connected via a connector 252 to other components of the connector module 112. In this embodiment, the removable printed circuit board 250 includes physical layer circuitry 254, Power-over-Ethernet circuitry 256, and LED control circuitry 258. The physical layer circuitry 254 could implement the same or similar functions as the physical layer circuitry 204 of FIG. 2A. Also, the Power-over-Ethernet circuitry 256 could implement the same or similar functions as the Power-over-Ethernet circuitry described above with respect to FIG. 2A. In addition, the LED control circuitry 258 could implement the same or similar functions as the LED control circuitry described above with respect to FIG. 2A.

In the illustrated example, the removable printed circuit board 250 resides outside of the shielding 214. As a result, air in the switching device 102 flows around the removable printed circuit board 250, which may help to dissipate heat from the removable printed circuit board 250. This may reduce or eliminate the need for a heat sink or other thermal device to be used to remove heat from the removable printed circuit board 250. Also, different manufacturers could produce different removable printed circuit boards 250. This may allow, for example, the replacement of the removable printed circuit board 250 when more capable, more integrated, or less expensive Power-over-Ethernet circuitry on the removable printed circuit board 250 becomes available.

The removable printed circuit board 250 is coupled to other components of the connector module 112 through the connector 252. For example, the connector 252 may be capable of receiving a portion of the removable printed circuit board 250 with or without leads. In some embodiments, the connector 252 represents a connector having a standardized or open source design with a standardized layout. In this way, different manufacturers could produce different removable printed circuit boards 250 that can operate in the connector module 112. Also, the removable printed circuit board 250 and the connector 252 could be associated with a standardized application protocol interface (API), which defines the protocols used by the removable printed circuit board 250 to communicate with other components through the connector 252. The connector 252 represents any suitable structure for interfacing the removable printed circuit board 250 and other components in the connector module 112.

As described above, the magnetics 208 associated with each jack socket 202 may have two center taps, and the two center taps could be connected to and accessible through the connector 252. This may allow, for example, manufacturers to produce removable printed circuit boards 250 that use the center taps in different ways.

While FIG. 2B illustrates the use of three separate circuitries 254, 256, 258 on the removable printed circuit board 250, other embodiments of the removable printed circuit board 250 may be used. For example, the removable printed circuit board 250 could include any number of components, such as a single circuit implementing all three functions.

As shown in FIG. 2C, yet another embodiment of the connector module 112 may include both a removable printed circuit board 250 and permanently embedded circuitry. In this example, the connector module 112 includes a removable printed circuit board 250 and embedded Power-over-Ethernet circuitry 256. The connector 252 includes connections connecting the Power-over-Ethernet circuitry 256 to the removable printed circuit board 250. This may allow, for example, the physical layer circuitry 254 to communicate with the Power-over-Ethernet circuitry 256.

While FIG. 2C illustrates the use of permanently embedded Power-over-Ethernet circuitry 256, other or additional logic could be permanently embedded in the connector module 112. Similarly, while FIG. 2C illustrates the use of physical layer circuitry 254 and LED control circuitry 258 on the removable printed circuit board 250, other or additional logic could be placed on the removable printed circuit board 250. For example, the Power-over-Ethernet circuitry 256 could be placed on the removable printed circuit board 250, and the physical layer circuitry 254 could be permanently embedded in the connector module 112.

Although FIGS. 2A through 2C illustrate different examples of connector modules 112, various changes may be made to FIGS. 2A through 2C. For example, the connector modules 112 could include any number of jack sockets 202, LEDs 206, and magnetics 208. Also, any other structure capable of retaining or otherwise supplying logic to the connector module 112 could be used in place of a printed circuit board 250.

FIG. 3 illustrates example magnetics 208 in a connector module 112 according to one embodiment of this disclosure. The magnetics 208 shown in FIG. 3 are for illustration only. Other magnetics could be used in the connector module 112 without departing from the scope of this disclosure.

As shown in FIG. 3, the connections 210a-210h to the embedded physical layer circuitry 204 or to the connector 252 are labeled "TRDx−" and "TRDx+", where x in this example ranges between one and four. Pairs of the connections 210a-210h, such as TRD1− and TRD1+, transport differential signaling to and from the magnetics 208. The connections 212a-212h to the jack socket 202 are labeled "J1" through "J8." Pairs of the connections 212a-212h, such as J1 and J2, represent twisted-pairs in the link 106.

In this example embodiment, the magnetics 208 include four transformers 302a-302d and four noise-rejecting coil filters 304a-304d. The transformers 302 and the noise-rejecting coil filters 304 provide a bridge between the physical layer circuitry 204, 254 and the jack socket 202. The noise-rejecting coil filters 304 also reject common mode noise between the jack socket 202 and the physical layer circuitry 204, 254. In addition, the transformers 302 and the noise-rejecting coil filters 304 attenuate unwanted frequencies and isolate the DC path by blocking DC voltage and current on the physical layer path side to prevent it from flowing into the link 106 through the jack socket 202 and vice versa.

In particular embodiments, the transformers 302 have a turns ratio of one-to-one, and each side of the transformers 302 has a center tap. Also, in particular embodiments, the noise-rejecting coil filters 304 represent filters each having three coils, although filters with other numbers of coils could be used. As shown in FIG. 3, the noise-rejecting coil filters 304 receive an input signal 308, which represents a power supply input for the magnetics 208. When three coils are used in the noise-rejecting coil filters 304, one of the coils may be used for power supply noise filtering.

In the illustrated embodiment, each of the transformers 302a-302d includes a center tap, and two center taps 310a-310b are located on the jack socket side of the transformers 302a-302b and receive input signals. In particular embodiments, the center tap 310a receives a 48V DC voltage and a 5V AC signal from the embedded physical layer circuitry 204, the removable printed circuit board 250, or the Power-over-Ethernet circuitry 256. In this particular embodiment, the other center tap 310b acts as a 48V return. The AC signal is supercomposed or superimposed onto the DC voltage and sent to a peripheral device 104 through the jack socket 202. In this way, the magnetics 208 supply operating power to the peripheral device 104 over a link 106.

The magnetics 208 also include resistors 312a-312d on the jack socket side of the transformers 302. The resistors 312 may have any suitable resistance or resistances, and the same or different resistances may be used. As a particular example, the resistors 312 may each have a resistance of seventy-five ohms. In addition, the magnetics 208 include capacitors 314a-314d, 316, and 318a-318d. The capacitors 314, 316, 318 could have any suitable capacitance or capacitances. For example, the capacitors 314a-314d may each have a capacitance of 0.1 µF and a rating voltage of 50V. In other embodiments, the two capacitors 314c-314d that are not connected to the center taps 310a-310b may be omitted in the magnetics 208. The capacitor 316 may have a capacitance of 1,000 pF, a rating voltage of 2,000V, and be coupled to a chassis ground associated with the chassis in which the connector module 112 resides (such as the case of the switching device 102). The capacitors 318a-318d may each have a capacitance of 0.1 µF and a rating voltage of 50V. These represent example resistances and capacitances that may be used in the magnetics 208.

Although FIG. 3 illustrates one example of the magnetics 208 in a connector module 112, various changes may be made to FIG. 3. For example, while FIG. 3 illustrates one example of the magnetics 208, other configurations of the magnetics 208 may be used. As a particular example, the IEEE 802.3af standard specifies several different configurations for the magnetics 208. Also, FIG. 3 illustrates the use of the noise-rejecting coil filters 304 on the left side of the transformers 302. In other embodiments, the noise-rejecting coil filters 304 could reside on the right side of the transformers 302, or noise-rejecting coil filters 304 could be placed on both sides of the transformers 302.

Figure 4A:
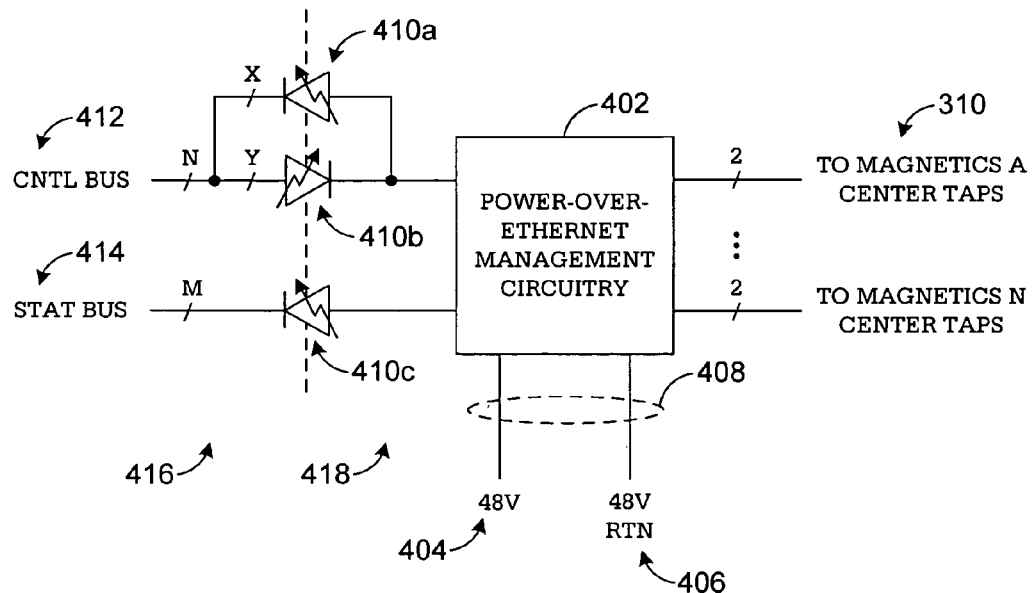
FIGS. 4A and 4B illustrate example isolation mechanisms for isolating voltages in a connector module according to one embodiment of this disclosure.
Figure 4B:
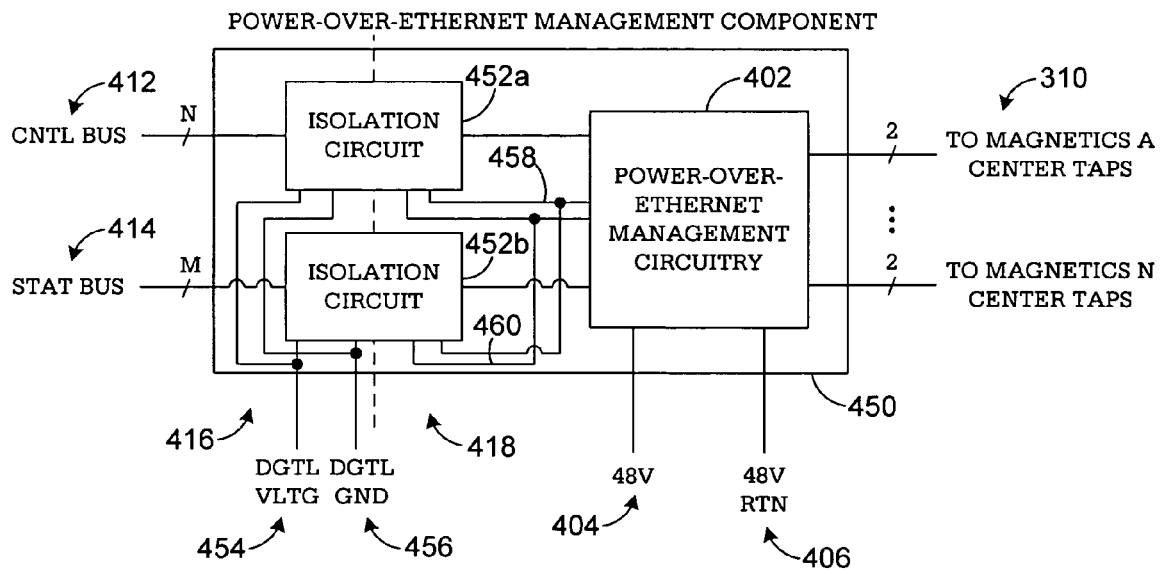

FIGS. 4A and 4B illustrate example isolation mechanisms for isolating voltages in a connector module 112 according to one embodiment of this disclosure. In particular, FIGS. 4A and 4B illustrate isolation mechanisms for isolating the 48V signal and 48V return used by the center taps 310 of the magnetics 208 from digitally-referenced voltages used by other components of the connector module 112. The isolation mechanisms shown in FIGS. 4A and 4B are for illustration only. Other isolation mechanisms could be used to isolate the voltages without departing from the scope of this disclosure.

As shown in FIG. 4A, an isolation mechanism is embedded within the connector module 112. The connector module 112 includes Power-over-Ethernet management circuitry 402, which could represent the Power-over-Ethernet circuitry in circuitry 204 or the Power-over-Ethernet circuitry 256. The Power-over-Ethernet management circuitry 402 supports the delivery of operating power to one or more peripheral devices 104 over one or more links 106. For example, the Power-over-Ethernet management circuitry 402 may detect when a peripheral device 104 has been connected to the connector module 112 over a link 106. The Power-over-Ethernet management circuitry 402 then determines whether the peripheral device 104 is capable of receiving operating power over the link 106. If so, an AC signal supercomposed or superimposed onto a DC voltage and a DC voltage return are provided to the magnetics 208 associated with the jack socket 202 connected to the peripheral device 104. The supercomposed or superimposed AC signal is used for AC disconnect detection, which allows the Power-over-Ethernet management circuitry 402 to identify when a peripheral device 104 is no longer connected to the link 106. The magnetics 208 then provide the Power-over-Ethernet AC signal and DC power to the peripheral device 104 through the jack socket 202, in addition to the physical layer Ethernet signal representing data being transmitted.

The Power-over-Ethernet management circuitry 402 receives power through a voltage line 404 and a return voltage line 406. The voltage line 404 and return voltage line 406 could, for example, represent the power supply voltage 224 and power supply voltage return 226 shown in FIGS. 2A through 2C. The power received over the voltage line 404 and the return voltage line 406 is used to supply power to the center taps 310 of the magnetics 208. In particular embodiments, the voltage line 404 and the return voltage line 406 form part of a single cable 408 coupled directly to the power supply 114 of the switching device 102. In this way, the motherboard 108 need not supply the power to the Power-over-Ethernet management circuitry 402.

To isolate the power supply voltage from digitally-referenced voltages used by other components in the connector module 112, the connector module 112 includes multiple optocouplers 410a-410c. The optocouplers 410 represent any suitable optical couplers capable of isolating voltages used in different domains. In other embodiments, other electrical isolation mechanisms may be used in place of the optocouplers 410.

In the example shown in FIG. 4A, two optocouplers 410a-410b are used to isolate digitally-referenced voltages of a control bus 412, and one optocoupler 410c is used to isolate digitally-referenced voltages of a status bus 414. In this example, the control bus 412 represents an N-bit bus, and the status bus 414 represents an M-bit bus. In the control bus 412, X bits represent outputs of the Power-over-Ethernet management circuitry 402, and Y bits represent inputs to the Power-over-Ethernet management circuitry 402.

Through the use of the optocouplers 410 within the connector module 112, the connector module 112 is divided into a digitally-referenced voltage domain 416 and an isolated power supply voltage domain 418. Because the voltages are isolated within the connector module 112, the voltages need not be isolated by the motherboard 108. This may help to reduce the cost and size of the motherboard 108. In some embodiments, only the Power-over-Ethernet management circuitry 402 is isolated from the digitally-referenced voltages in the connector module 112. In particular embodiments, the Power-over-Ethernet management circuitry 402 includes a microcontroller or a microprocessor, which may reside inside the isolated power supply domain. The microcontroller or microprocessor may communicate with the motherboard 108 to provide status and high level control of the Power-over-Ethernet management circuitry 402. Also, in particular embodiments, the voltage used by the Power-over-Ethernet management circuitry 402 may be "isolated" when the voltage differs from the digitally-referenced voltages by a specified amount, such as by at least 1,500V (Root-Mean-Square value) or other amount needed for safety.

In another embodiment shown in FIG. 4B, a Power-over-Ethernet management component 450 includes the Power-over-Ethernet management circuitry 402 and two isolation circuits 452a-452b. The Power-over-Ethernet management component 450 is then embedded within the connector module 112. The Power-over-Ethernet management component 450 may, for example, represent the Power-over-Ethernet circuitry 256 shown in FIG. 2C.

The isolation circuits 452 represent circuitry used to isolate the voltage used by the Power-over-Ethernet management circuitry 402 from a digital voltage 454 and a digital ground 456 used by the motherboard 108 and the physical layer circuitry. The digital voltage 454 and digital ground 456 may, for example, represent the digital voltage 220 and digital ground 222 shown in FIGS. 2A through 2C. To isolate the voltage used by the Power-over-Ethernet management circuitry 402 from the digital voltage 454 and digital ground 456, the Power-over-Ethernet management circuitry 402 provides a voltage 458 and a ground 460 to the isolation circuits 452. The isolation circuits 452 then isolate the voltage 454 on one side of the isolation circuits 452 from the voltage 458 on the other side of the isolation circuits 452, where the voltages 454, 458 are referenced to different grounds 456, 460.

By isolating the different voltages within the Power-over-Ethernet management component 450, the voltages need not be isolated by the motherboard 108. This may help to reduce the size and cost of the motherboard 108. Moreover, because the voltages are isolated within the Power-over-Ethernet management component 450, the voltages need not be isolated by other components within the connector module 112. This may help to reduce the size and cost of the connector module 112.

The various isolation mechanisms shown in FIGS. 4A and 4B could be implemented in any suitable manner in the connector module 112. For example, in some embodiments, an isolation mechanism is implemented entirely within the shielding 214 of the connector module 112. In other embodiments, an isolation mechanism is implemented entirely outside of the shielding 214. In yet other embodiments, a portion of the isolation mechanism is implemented within the shielding 214.

Although FIGS. 4A and 4B illustrate two examples of isolation mechanisms for isolating voltages in a connector module 112, various changes may be made to FIGS. 4A and 4B. For example, other techniques may be used to isolate the different voltages in the connector module 112.

Figure 5:
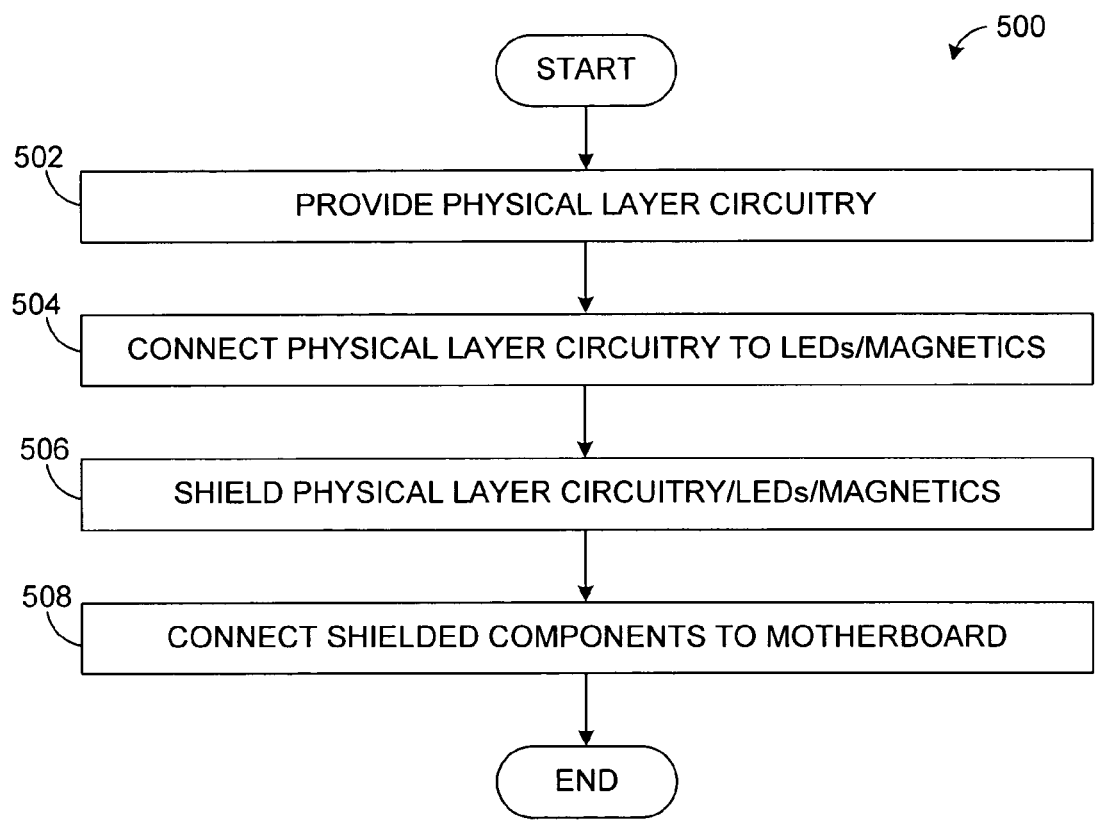
FIG. 5 illustrates an example method for providing a connector module having embedded physical layer support according to one embodiment of this disclosure.

FIG. 5 illustrates an example method 500 for providing a connector module 112 having embedded physical layer support according to one embodiment of this disclosure. For ease of explanation, the method 500 is described with respect to the connector module 112 shown in FIG. 2A. The method 500 may be used with any other connector module 112 without departing from the scope of this disclosure.

Physical layer circuitry is provided at step 502. This may include, for example, a manufacturer fabricating, programming, producing, or otherwise obtaining an integrated circuit chip that contains logic for supporting one or more physical layer protocols, such as 10Base-T, 100Base-T, and/or 1000Base-T Ethernet. The physical layer circuitry 204 may or may not include Power-over-Ethernet circuitry, which supports providing operating power to one or more peripheral devices 104 over links 106. The physical layer circuitry 204 also may or may not include LED control circuitry, which controls the operation of one or more LEDs 206 by driving the LEDs 206 into different states.

The physical layer circuitry is coupled to LEDs and magnetics at step 504. This may include, for example, coupling the physical layer circuitry 204 to the magnetics 208 using multiple connections 210. This may or may not include connecting the physical layer circuitry 204 to the center taps 310 of the magnetics 208. In particular embodiments, the physical layer circuitry 204 implements the Power-over-Ethernet management functionality, and the Power-over-Ethernet management logic portion of circuitry 204 is coupled to the center taps 310 of the magnetics 208.

The physical layer circuitry, LEDs, and magnetics are shielded at step 506. This may include, for example, encasing the physical layer circuitry 204, the LEDs 206, and the magnetics 208 within a shielding 214 that reduces or prevents electro-magnetic forces or other interference from affecting non-shielded components of the switching device 102. This may also include encasing other components in the shielding 214, such as one or more jack sockets 202.

The shielded components are connected to a motherboard at step 508. Collectively, the shielded components form a connector module 112, and the connector module 112 may be connected to a motherboard 108 in any suitable manner. For example, the connector module 112 may be connected to the motherboard 108 using a ball grid array, through pin holes, using press fit connections, or other electrical connections.

Although FIG. 5 illustrates one example of a method 500 for providing a connector module 112 having embedded physical layer support, various changes may be made to FIG. 5. For example, the physical layer support could be implemented in logic other than in circuitry. Also, the physical layer circuitry 204 need not be coupled to any LEDs 206.

Figure 6:
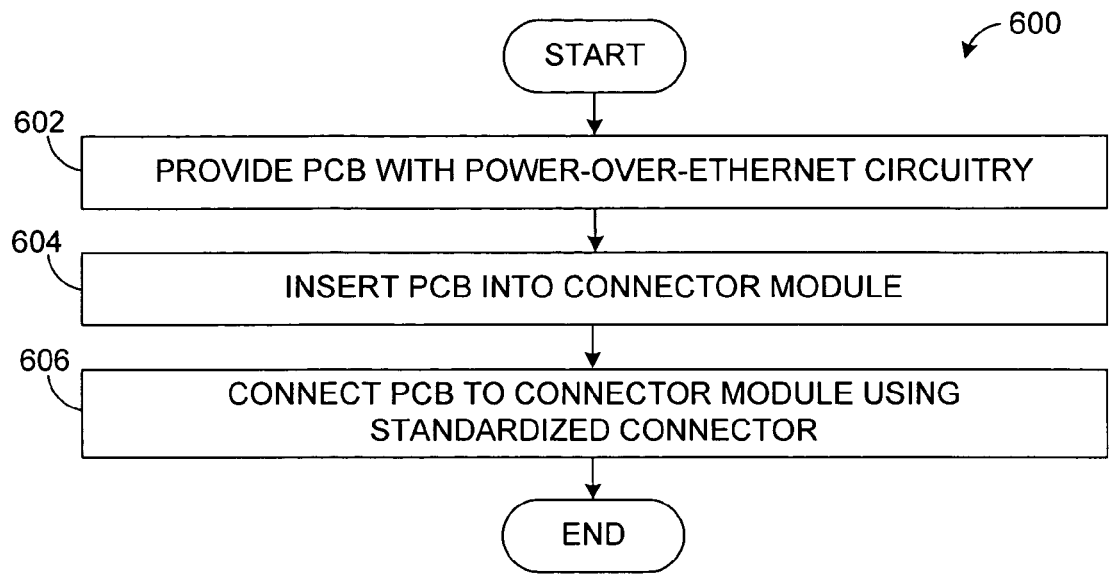
FIG. 6 illustrates an example method for providing a connector module having removable Power-over-Ethernet support according to one embodiment of this disclosure.

FIG. 6 illustrates an example method 600 for providing a connector module 112 having removable Power-over-Ethernet support according to one embodiment of this disclosure. For ease of explanation, the method 600 is described with respect to the connector module 112 shown in FIG. 2B. The method 600 may be used with any other connector module 112 without departing from the scope of this disclosure.

A printed circuit board having Power-over-Ethernet circuitry is provided at step 602. This may include, for example, a manufacturer fabricating, programming, producing, or otherwise obtaining a printed circuit board 250 that contains circuitry for supporting Power-over-Ethernet functions. The circuitry could include Power-over-Ethernet circuitry 256 or other logic. The printed circuit board 250 may or may not include physical layer circuitry or LED control circuitry.

The printed circuit board is inserted into a connector module 112 at step 604. This may include, for example, inserting the printed circuit board 250 into a slot of the connector module 112. This may also include inserting the printed circuit board 250 into the connector module 112 so that the printed circuit board 250 remains outside of the shielding 114 of the connector module 112.

The printed circuit board is connected to the connector module 112 using a standardized connector at step 606. This may include, for example, inserting leads of the printed circuit board 250 into the connector 252. This electrically connects the Power-over-Ethernet circuitry to the magnetics 208. This may also electrically connect any additional circuitry on the printed circuit board 250 to other components in the connector module 112.

Although FIG. 6 illustrates one example of a method 600 for providing a connector module 112 having removable Power-over-Ethernet support, various changes may be made to FIG. 6. For example, the Power-over-Ethernet circuitry could be provided on any structure capable of retaining or otherwise supplying the Power-over-Ethernet circuitry or other logic to the connector module 112.

Figure 7:
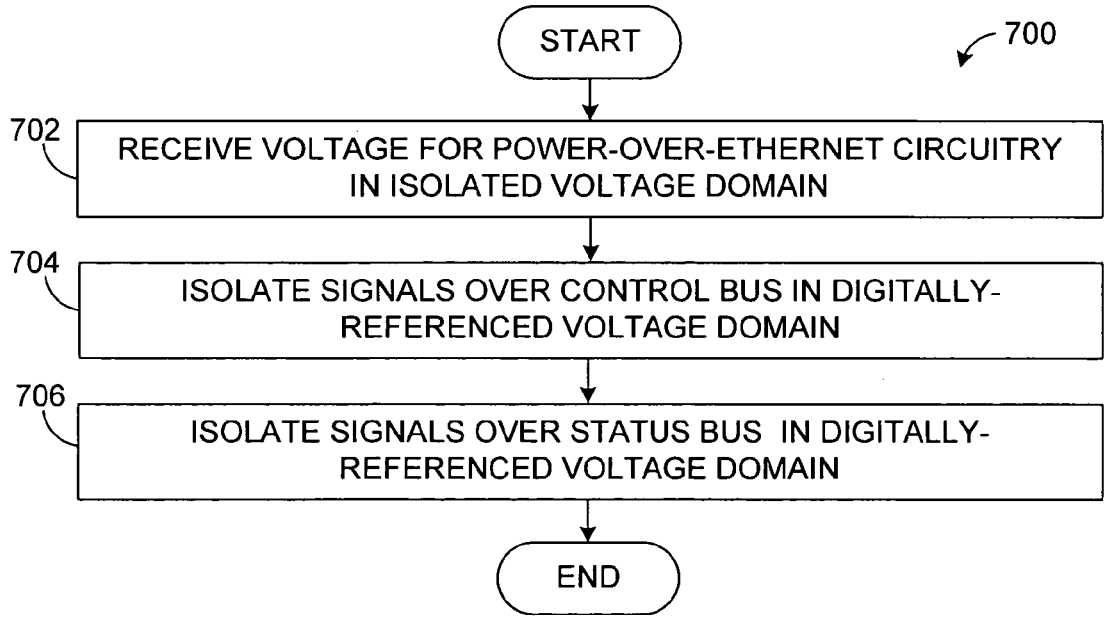
FIG. 7 illustrates an example method for isolating voltages in a connector module according to one embodiment of this disclosure.

FIG. 7 illustrates an example method 700 for isolating voltages in a connector module 112 according to one embodiment of this disclosure. For ease of explanation, the method 700 is described with respect to the isolation mechanisms shown in FIGS. 4A and 4B. The method 700 may be used with any connector module 112 using any other isolation mechanism without departing from the scope of this disclosure.

The connector module 112 receives power for Power-over-Ethernet circuitry at step 702. This may include, for example, the connector module 112 receiving power from a power supply 114 over a voltage line 404 and a return voltage line 406.

The connector module 112 isolates one or more signals communicated over a control bus in a digitally-isolated voltage domain at step 704. This may include, for example, one or more optocouplers 410 or isolation circuits 452 isolating the signals communicated over the control bus 412 from the power supply voltage received at step 702.

The connector module 112 isolates one or more signals communicated over a status bus in a digitally-isolated voltage domain at step 706. This may include, for example, one or more optocouplers 410 or isolation circuits 452 isolating the signals communicated over the status bus 414 from the power supply voltage received at step 702. In this way, the voltage used by the Power-over-Ethernet circuitry is isolated from the voltages used by other components of the switching device 102.

Although FIG. 7 illustrates one example of a method 700 for isolating voltages in a connector module 112, various changes may be made to FIG. 7. For example, the connector module 112 could isolate any signals in the digitally-isolated voltage domain other than or in addition to the control and status signals.

Although this document has described connector modules 112 with various features, particular embodiments of the connector module 112 may include one, some, or all of these features. For example, a connector module 112 could include embedded physical layer circuitry 204 without a removable printed circuit board 250 or a voltage isolation mechanism. A connector module 112 could also include Power-over-Ethernet circuitry on a removable printed circuit board 250 without embedded physical layer circuitry 204 or a voltage isolation mechanism. A connector module 112 could further include a voltage isolation mechanism without a removable circuit board 250 or embedded physical layer circuitry 204.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A connector module, comprising:
    a jack socket receiving a communication link;
    magnetics coupled to the jack socket, the magnetics supplying power to a peripheral device coupled to the link through the jack socket;
    Power-over-Ethernet management logic controlling the supplying of power to the peripheral device by the magnetics; and
    at least one voltage isolator operable for dividing the connector module into a digitally-referenced voltage domain and an isolated power supply voltage domain and isolating one or more digitally-referenced voltage signals in the digitally-referenced voltage domain from the Power-over-Ethernet management logic in the isolated power supply voltage domain, and wherein the at least one voltage isolator is a one of: implemented within a shielding of the connector module and removable from the connector module.

2. The connector module of claim 1, wherein the at least one voltage isolator comprises at least one of: one or more isolation circuits embedded in a Power-over-Ethernet management component that comprises the Power-over-Ethernet management logic and one or more optocouplers.

3. The connector module of claim 2, wherein the at least one voltage isolator isolates the voltage used by the Power-over-Ethernet management circuitry from the one or more digitally-referenced voltage signals communicated over at least one bus between one or more components within the digitally-referenced voltage domain and the Power-over-Ethernet management logic.

4. The connector module of claim 3, wherein the at least one bus comprises at least one of a control bus and a status bus.

5. The connector module of claim 4, wherein:
    the at least one bus comprises the control bus and the status bus; and
    the at least one voltage isolator further comprises,
    two optocouplers for isolating a first digitally-referenced voltage signal in the control bus, and
    one optocoupler for isolating a second digitally-referenced voltage signal in the status bus.

6. The connector module of claim 2, wherein the one or more isolation circuits isolate the voltage used by the Power-over-Ethernet management logic from a digital voltage and a digital ground received by the one or more isolation circuits.

7. The connector module of claim 1, wherein the Power-over-Ethernet management logic is coupled to at least two center taps of the magnetics.

8. The connector module of claim 1, wherein the magnetics comprise:
    a transformer; and
    a coil filter coupled to the transformer, the coil filter comprising two coils receiving a differential input signal and a third coil receiving a power supply input for the magnetics.

9. The connector module of claim 1, wherein the voltage isolator is within the shielding and the Power-over-Ethernet management logic is within the shielding.

10. The connector module of claim 1, wherein the Power-over-Ethernet management logic comprises an integrated circuit chip.

11. The connector module of claim 1, wherein the magnetics comprise:
    a transformer; and
    a coil filter coupled to the transformer, the coil filter comprising two coils receiving a differential input signal and a third coil receiving a power supply input for the magnetics.

12. The connector module of claim 1, wherein:
    the magnetics comprise a first transformer and a second transformer, each transformer having a center tap located on a side of the transformer associated with the jack socket;
    the center tap of the first transformer receives and superimposes an alternating current (AC) signal onto a direct current (DC) voltage, the DC voltage comprising the power supplied to the peripheral device, the Power-over-Ethernet management logic using the AC signal to determine when the peripheral device has been disconnected from the communication link; and
    the center tap of the second transformer acts as a voltage return associated with the DC voltage.

13. A motherboard, comprising:
    a processor communicating with at least one peripheral device; and
    a connector module comprising:
        a jack socket receiving a communication link;
        magnetics coupled to the jack socket, the magnetics supplying power to the peripheral device through the jack socket;
        Power-over-Ethernet management logic controlling the supplying of power to the peripheral device by the magnetics; and
        at least one voltage isolator operable for dividing the connector module into a digitally-referenced voltage domain and an isolated power supply voltage domain and isolating one or more digitally-referenced voltage signals in the digitally-referenced voltage domain from the Power-over-Ethernet management logic in the isolated power supply voltage domain, and wherein the at least one voltage isolator is a one of: implemented within a shielding of the connector module and removable from the connector module.

14. The motherboard of claim 13, wherein the at least one voltage isolator comprises at least one of: one or more isolation circuits embedded in a Power-over-Ethernet management component that comprises the Power-over-Ethernet management logic and one or more optocouplers.

15. The motherboard of claim 14, wherein the at least one voltage isolator isolates the voltage used by the Power-over-Ethernet management logic from the one or more digitally-referenced voltage signals communicated over at least one bus between one or more components within the digitally-referenced voltage domain and the Power-over-Ethernet management logic.

16. The motherboard of claim 15, wherein the at least one voltage isolator further comprises:
  two optocouplers for isolating a first digitally-referenced voltage signal in a control bus; and
  one optocoupler for isolating a first digitally-referenced voltage signal in a status bus.

17. The motherboard of claim 15, wherein the one or more isolation circuits isolate the voltage used by the Power-over-Ethernet management logic from a digital voltage and a digital ground received by the one or more isolation circuits.

18. The motherboard of claim 13, wherein the Power-over-Ethernet management logic is coupled to at least two center taps of the magnetics.

19. The motherboard of claim 13, wherein the magnetics comprise:
  a transformer; and
  a coil filter coupled to the transformer, the coil filter comprising two coils receiving a differential input signal and a third coil receiving a power supply input for the magnetics.

20. The motherboard of claim 13, wherein the at least one voltage isolator is within the shielding and the Power-over-Ethernet management logic is within the shielding.

21. A method, comprising:
  receiving a voltage for Power-over-Ethernet management logic from a power supply, the Power-over-Ethernet management logic forming a portion of a connector module coupled to a peripheral device over a communication link;
  dividing the connector module into a digitally-referenced voltage domain and an isolated power supply voltage domain by isolating the voltage received for the Power-over-Ethernet management logic from at least one digitally-referenced voltage used by the connector module; and
  isolating the voltage using at least one voltage isolator that is a one of: implemented within a shielding of the connector module and removable from the connector module.

22. The method of claim 21, wherein isolating the voltage from the power supply and the at least one digitally-referenced voltage comprises isolating the voltage from the power supply and the at least one digitally-referenced voltage used in at least one bus.

23. The method of claim 21, wherein the Power-over-Ethernet management logic is coupled to at least two center taps of magnetics in the connector module.

24. An apparatus, comprising:
  a motherboard comprising a processor;
  a connector module coupled to the motherboard and comprising:
    a plurality of jack sockets receiving a plurality of communication links;
    a plurality of magnetics coupled to the jack sockets, the plurality of magnetics supplying power to a plurality of peripheral devices coupled to the links through the jack sockets;
    Power-over-Ethernet management logic controlling the supplying of power to the peripheral device by the plurality of magnetics; and
    at least one voltage isolator operable for dividing the connector module into a digitally-referenced voltage domain and an isolated power supply voltage domain and isolating one or more digitally-referenced voltage signals in the digitally-referenced voltage domain from the Power-over-Ethernet management logic in the isolated power supply voltage domain, and wherein the at least one voltage isolator is a one of: implemented within a shielding of the connector module and removable from the connector module; and
  a power supply supplying power to at least one of the motherboard and the connector module.

25. The apparatus of claim 24, wherein the at least one voltage isolator is within the shielding and the Power-over-Ethernet management logic is within the shielding.

* * * * *